United States Patent Office 2,781,244
Patented Feb. 12, 1957

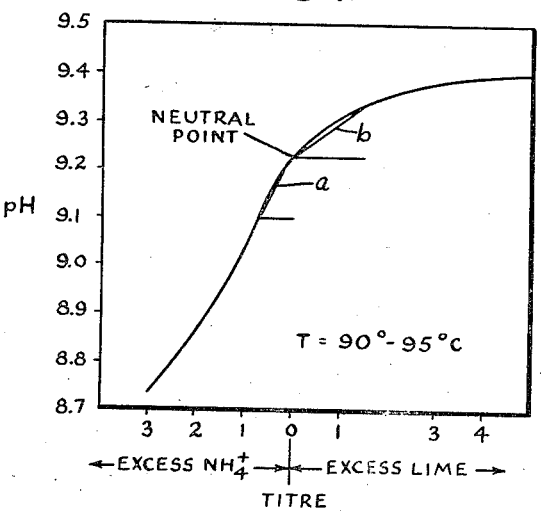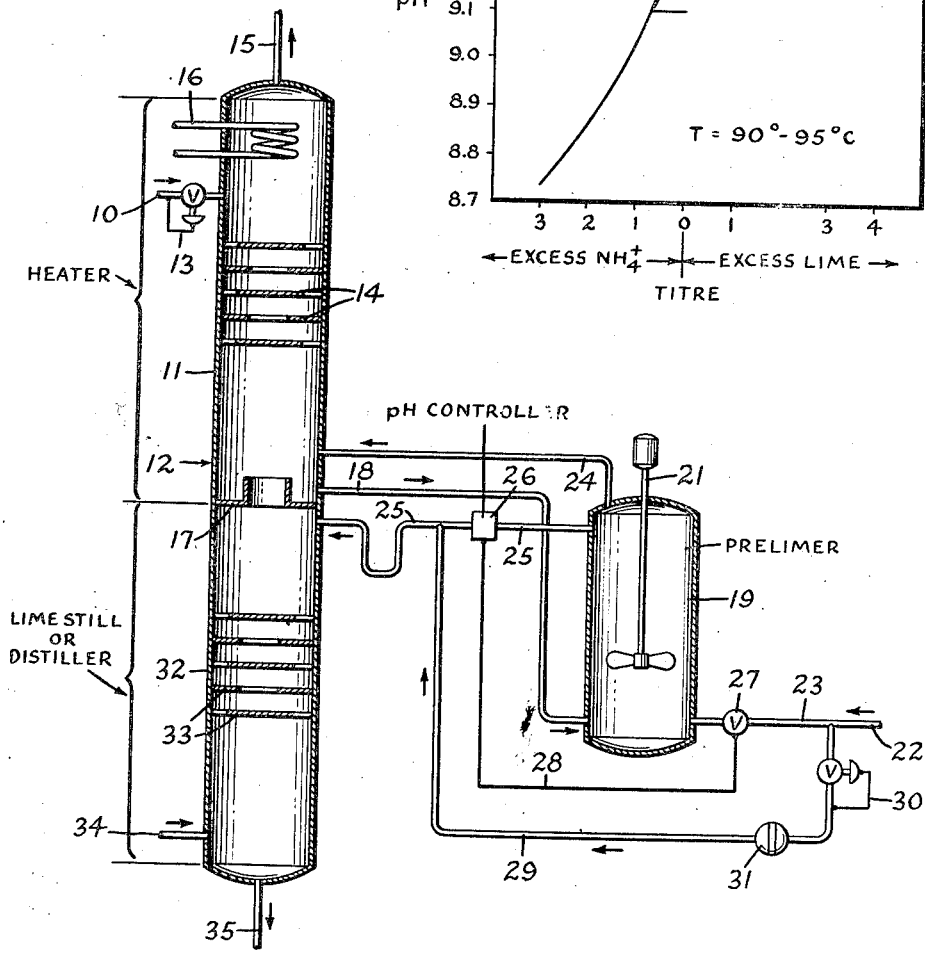

2,781,244
CONTROLLED RECOVERY OF AMMONIA FROM LIQUORS CONTAINING FIXED AMMONIA VALUES

Clarence F. Hecklinger, Syracuse, N. Y., assignor to Allied Chemical & Dye Corporation, New York, N. Y., a corporation of New York Application September 18, 1952, Serial No. 310,320

3 Claims. (Cl. 23—193)

The present invention relates to the recovery of ammonia values from liquors containing fixed ammonia, involving the use of lime for liberation of ammonia in free form.

As known, there are several industrial fixed ammonia-containing liquors from which it is desired to recover free ammonia by addition of lime to the liquor and distillation of resultant free ammonia therefrom. One such liquor is the ammonium chloride containing filtrate which remains in the ammonia soda process for production of soda ash after separation of sodium bicarbonate from the reaction medium. Another such liquor may be exemplified by the so-called ammonia liquors obtained by a number of methods for processing coal tar or coking distillates. Such liquors may or may not contain free ammonia. If they do, it has been customary to pass them through an ammonia heater for stripping out free ammonia by the application of heat, steam, or both to leave substantially all remaining ammonia components of such liquors in fixed form, for example, as ammonium salts of acids. The fixed forms of ammonia are then converted by treatment of the solution containing them with lime to produce free ammonia and the corresponding calcium salt. The lime treated liquor is thereafter stripped of free ammonia by use of heat, steam, or both in a suitable distillation unit commonly termed a lime still.

For maximum recovery of free ammonia, it has been considered good practice so to regulate the quantity of lime employed, that still effluent denuded of ammonia contains unreacted lime. If too large an excess of lime be used to achieve this result, resultant loss of lime becomes of substantial economic importance. On the other hand, attempts to limit the excess of lime to a reasonably small and normal amount during continuous commercial operation has not heretofore met with unqualified success because even under satisfactorily steady operation variations occur from time to time, for example in the rate of flow of liquor and concentration of ammonium salt content thereof, which have resulted in periodic deficiencies of lime and loss of valuable ammonia unless substantial excesses of lime have been deliberately used. It has become the preferred operation to use such substantial excesses of lime and take the calculated average loss of that material rather than incur substantial losses of the more expensive ammonia.

Many attempts have been made by way of regulation of quantity or rate of lime feed to provide a practical solution of this problem. Such attempts have included methods and devices to provide constant feed of lime. Also attempts have been made to control lime feed in response to changes in the pH of lime still residue, but these have resulted in unsatisfactory control because the pH of ammonia liquors (about 9.23 in the case of filter liquor in the ammonia-soda process) undergoes only small changes in response to large differences in content of unreacted lime. In other words, the curve of titre vs. pH in the region concerned has relatively low slope from the point of zero content of free ammonia in the direction of excess lime, which slope decreases with increases in lime content. By titre is meant the number of cubic centimeters of standard one normal solution of sodium hydroxide which is required to neutralize twenty cubic centimeters of fixed ammonia containing liquor, devoid of free ammonia and carbon dioxide, using phenolphthalein as indicator after allowing an excess of neutral formaldehyde to react with the fixed ammonia for about one minute. Generally, the titre is expressed as the number of cubic centimeters of such solution on either side of the end point (point of stoichiometric equivalency) at which all fixed ammonia is liberated.

One object of this invention is to control the liberation of ammonia from fixed ammonia-containing liquors. A second object is to effect such control while realizing maximum liberation of free ammonia and minimum consumption of lime. Further objects of the invention are apparent from the following description.

According to this invention, controlled addition of lime to the fixed ammonia-containing liquor is made in two steps. In the first step a quantity of lime controlled to leave a predetermined deficiency of lime, is added to the liquor. During the second step, lime is added in quantity predetermined to be adequate to supply the lime deficiency, and also to provide a slight excess of lime in the final reaction mixture. In practice, the deficiency of lime resulting from the first addition will sometimes vary, but within narrow limits. The predetermined quantity of lime added during the second step may be adjusted to compensate for such variations; however it is preferred that the second addition be at constant rate or substantially so. The preferably larger quantity of lime introduced during the first step may be, and preferably is, controlled in response to measurement of pH of fixed ammonia-containing liquor to which the first addition of lime has been made, so as to maintain that pH substantially constant and somewhat below the point at which stoichiometric equivalency of lime and ammonia occurs. For example, the first lime addition may be controlled so as to maintain pH values of the order of 0.05 to 0.50 units below that point. In the case of recovery of ammonia from the ammonia-soda filter liquor, the pH control mentioned would normally be at a suitable value within the range of say 8.8 to 9.2 pH and preferably above 9.1 pH. In the second lime addition step, sufficient quantity of this material is added, preferably the amount calculated to compensate for the stoichiometric deficiency and to provide an excess of no more than 2.0 titres, and preferably between 0.5 to 1.5 titres of lime past the end point, say 1.0 titre.

It has been discovered that upon control of addition of lime by increments in the manner described, consumption of lime and excess lime in the lime still residue are very appreciably decreased without sacrifice of free ammonia recovery. In the first addition, deviations from normal operation conditions are automatically and accurately compensated for, permitting accurate control of the second addition of the quantity of lime calculated as necessary to achieve the slight or minimum excess desired.

According to a particular embodiment of this invention, a brine containing ammonium chloride and lesser amounts of sodium chloride and free ammonia, such as is found as mother-liquor in the ammonia-soda process, is passed to a contact tower containing shower trays. The upper portion of this tower is operated as a "heater" to strip the bulk of the free ammonia from the solution by means of ascending steam. The ammonia-free solution is passed from a trap-off tray in the intermediate portion of the tower to a prelimer tank containing agitation means. The ammonia-free solution enters the tank at the bottom and is contacted with lime therein, thereby liberating gaseous ammonia which is passed back to the heater. After a reasonable digestion and contact time, the solution is withdrawn. The amount of lime present at this point is less than that required to liberate all the ammonia contained in the solution in the form of ammonium ions.

The withdrawn solution is passed through a pH meter which, in response to the measured pH of the solution controls the amount of lime added to the prelimer, thus maintaining the pH of the solution below about 9.23, i. e., on the fixed ammonia side of the end point. To this solution is then added a predetermined amount of additional lime to insure that the net resulting solution is safely on the excess lime side of the end point and thus prevent the loss of ammonia as ammonium chloride. Only a very slight excess of lime will be present in the solution, which is thence passed to the "lime still" or "distiller" wherein the liberated ammonia is steam stripped, thereby forming an ammonia-free bottoms containing only a slight excess of lime.

A fuller understanding of the invention may be had from the following description, including reference to the drawings in which:

Figure 1 is a graph whereon is represented the relationship between the appropriate important variables by which this process may be controlled, and Figure 2 is a flow sheet of a particular embodiment of this process.

The curve of Figure 1 graphically illustrates, as a function of the titre, the changes in pH within an ammonium chloride liquor from the ammonia-soda process. The titre is expressed in terms of cubic centimeters of standard reagent required to titrate an ammoniacal solution as hereinbefore explained in detail. The neutral point has been here chosen as the origin, the number of titres increasing to the left as an excess of fixed ammonia is present in the solution and to the right as an excess of lime is present. The pH point of stoichiometric equivalency, under the conditions of concentration herein present is found to be 9.23, at which point the amount of lime present is enough to just satisfy the equation:

$$Ca(OH)_2 + 2NH_4Cl \rightleftharpoons 2NH_3 + 2H_2O + CaCl_2 \quad (1)$$

In the graph of Figure 1, which represents operation according to one embodiment of this invention, lines $a$ and $b$ subtend the portions of the curve of the particular system, which characterize the liquor after the addition of the lime as it is added respectively in the first and second steps according to the preferred practice of the invention. Thus it is preferred that the first addition be of such quantity as to raise the pH to within the range of 9.1 to 9.2 as subtended by line $a$ in the drawing and then to add in the second step, the quantity of lime which results in an excess of 1.5 titres or less. The first step may be effected to maintain pH in the region of about 9.15. In this embodiment about 2.0 titres of lime are added in the second step, resulting in an excess of about 1.5 titres or less which permits complete recovery of available ammonia therein during the subsequent distillation.

In the specific embodiment shown in the flow sheet of Figure 2, an ammonium salt-containing liquid such as the filtrate from the sodium bicarbonate in the ammonia-soda process, and which may contain free ammonia as dissolved ammonia or ammonium hydroxide, in addition to ammonium chloride and sodium chloride, is passed through line 10 to the upper part of the "heater" portion 11 of vessel 12. The flow of ammonium salt-liquor in line 10 may be set and maintained constant by flow regulator 13 in line 10. The liquor passes downwardly in heater 11 over the shower decks 14 where it is contacted with upwardly ascending heated vapors including steam and ammonia, whereby a portion of the free ammonia (i. e. ammonia not present as ammonium ion) is removed upwardly to be ultimately withdrawn through line 15. Heater 11 may advantageously contain a refluxing means such as cooling coils 16 whereby some degree of rectification may be obtained, thereby insuring that the effluent ammonia in line 15 is reasonably free of moisture.

The stripped ammonia liquor, now containing a certain portion of free ammonia in addition to the fixed ammonia, is collected on draw-off tray 17 in the lower portion of heater 11 and passed through line 18 to prelimer 19, which contains an agitator 21.

Although this invention may also be adapted to function with solid lime, it is found convenient to use a lime-containing solution or suspension. This may be admitted to the system through line 22. The major portion of the lime which may preferably be 85–95% of that flowing in from line 22, is passed therefrom through line 23 into the vessel 19. The amount of lime passed through line 23 will always be less than the stoichiometric amount equivalent to the fixed ammonia in line 18, according to Equation 1 above. It is found in practice that the advantages of this invention are utilized to the fullest extent, and that greater operating facility and efficiency are obtained if the lime in line 23 is the greater portion of the stoichiometric amount, preferably between about 85% and about 95% thereof.

The ammonium chloride and lime in vessel 19 react to liberate ammonia which is returned through line 24 to heater 11. The resulting solution now contains mostly free ammonia and a small amount of fixed ammonia, the pH being less than 9.23 and generally greater than 8.8 when, for example, only 95% of the stoichiometric amount of lime has been added. Thus this solution is still on the excess fixed ammonia side of the neutral position as shown in Figure 1.

The prelimer effluent in line 25 passes through pH meter 26 wherein the pH of this effluent is measured. A signal is generated herein in accordance with the measured pH and transmitted back through line 28 to valve 27 in line 23. If, for example, due to unforeseen changes in the quality or quantity of either of the feed solutions to prelimer 19, it should happen that the pH of the effluent therefrom is too high, and therefore that there was an excess of lime, then the generated signal in line 28 operates to slightly close valve 27, lowering the amount of lime added until the solution is of the proper pH. Similar converse operations occur when the pH recorded by meter 26 is too low, the signal then operating to open valve 27. It is to be noted that the point of measurement of the pH is only restricted in that it must be after the original lime in line 23 has contacted and been thoroughly mixed with the solution in line 18. Thus the pH measurement point may be in the upper portion of vessel 19.

The pH of this solution passing through meter 26 is controlled to maintain the solution on the excess ammonia side, and usually from 0.05 to 0.50 pH units below the neutral point. After measurement of the pH, additional lime is admitted to the solution through line 29. The flow of lime herein may be made constant with respect to the flow of liquor in line 18 and may be controlled by flow control valve 30 and orifice 31. The additional lime in line 29 will preferably come from a common source as that in line 23, but not necessarily so—nor must it necessarily be in the same form or concentration as that in line 23.

The preferably constant amount of lime added through line 29 is fixed within certain limits. It must be enough to raise the pH of the solution in line 25 at least to 9.23, the end point. Alternatively stated, the total lime supplied through lines 23 and 29 must be at least equal to the stoichiometric amount hereinbefore referred to, and preferably it is in slight excess.

The maximum amount of lime added through line 29 is fixed by the inadvisability of having large excesses of lime present in the effluent. Under the method of operation hereinbefore set forth, it is found possible to operate with less than 4 percent of lime over the stoichiometric amount, as compared to the 5 to 8 percent excess required under prior methods of operation.

The properly neutralized effluent is passed from line 25 to the top of a "lime still" or "distiller" 32 which may advantageously be incorporated into the lower portion of the tower 12. Distiller 32 contains decks 33 similar to decks 14 of heater 11. The descending effluent is contacted with ascending steam from line 34 which strips ammonia therefrom. The run-off liquor removed through line 35 will contain less than 0.5 titre of total ammonia and less than 4 percent of lime in excess of the stoichiometric amount required.

The liquid in line 35 may be periodically analyzed to determine the amount of ammonia or lime contained therein. If, for example, it should happen that the amount of ammonia or of lime is in excess by too great an amount, then the resetting of meter 26 could conveniently be made. This condition might occur when external circumstances (e. g., impurities in the solution) modified the system to such a degree that the pH of the new stoichiometric end point was different from that set previously.

It will be understood by persons skilled in the art that certain aspects of the present invention are applicable to systems other than that specifically described. This pH control system may be utilized regardless of the precise manner of preliming, so long as the solution, at the point of pH measurement is on the excess ammonia side rather than on the excess lime side of the end point. Thus this invention is useful whether the preliming is conducted with wet or dry lime, with homogeneous or heterogeneous types and sizes of lime, or in several steps. It may, for example, be utilized in connection with a two-stage liming operation wherein the ammonium-containing solution is contacted first with a coarse, relatively less active lime and subsequently with a fine, relatively more active lime, a portion of the latter being preferably added after the pH reading is taken.

I claim:

1. In the method of recovering ammonia in free form from a charge stream of liquid containing varying quantities of ammonium salts, wherein the charge stream is treated with lime to decompose the ammonium salts and liberate ammonia, the improvement which comprises adding to and reacting with the charge stream in a first liming zone a major portion, in the order of about 85% to about 95%, in variable quantity of the lime required to liberate the ammonia content of said stream, thereby providing free ammonia and a partially reacted stream containing residual, unreacted ammonium salts, separately withdrawing free ammonia and said partially reacted stream from said first liming zone, controlling the quantity of lime added within said first zone in response to pH determination of said partially reacted stream to maintain the same at an approximately constant level below that of the charge stream reacted with lime in amount stoichiometrically equivalent to its ammonium salt content, sending the partially reacted stream through a second liming zone, therein adding a constant quantity of lime providing a slight stoichiometric excess thereof with respect to unreacted ammonium salts, and removing free ammonia from the reacted product of said second zone, whereby substantially complete recovery of ammonia in free form is realized upon use of minimum quantity of lime.

2. In the method of recovering ammonia in free form from a charge stream of liquid containing varying quantities of ammonium salts, wherein the charge stream is treated with lime to decompose the ammonium salts and liberate ammonia, the improvement which comprises adding to and reacting with the charge stream in a first liming zone about 85% to about 95% in variable quantity of the lime required to liberate the ammonia content of said stream, thereby providing free ammonia and a partially reacted stream containing residual, unreacted ammonium salts, separately withdrawing free ammonia and said partially reacted stream from said first liming zone, controlling the quantity of lime added within said first zone in response to pH determination of said partially reacted stream to maintain the same at an approximately constant level within the range of 0.05 to 0.5 unit below that of the charge stream reacted with lime in amount stoichiometrically equivalent to its ammonium salt content, sending the partially reacted stream through a second liming zone, therein adding a constant quantity of lime providing a slight stoichiometric excess thereof with respect to unreacted ammonium salts, and removing free ammonia from the reacted product of said second zone, whereby substantially complete recovery of ammonia in free form is realized upon use of minimum quantity of lime.

3. In the method of recovering ammonia in free form a charge stream of brine which is obtained from the ammonia-soda process for production of soda ash and contains free ammonia and varying quantities of ammonium chloride, wherein the charge stream is stripped of free ammonia and is then treated with lime to decompose the ammonium chloride and liberate ammonia, the improvement in liming operation which comprises adding to and reacting with the charge stream in a first liming zone about 85% to about 95% in variable quantity of the lime required to liberate the ammonia content of said stream, thereby providing free ammonia and a partially reacted stream containing residual, unreacted ammonium chloride, separately withdrawing free ammonia and said partially reacted stream from said first liming zone, controlling the quantity of lime added within said first zone in response to pH determination of said partially reacted stream to maintain the same at an approximately constant level within the range of 8.73 to 9.18 at 90° to 95° C., sending the partially reacted stream through a second liming zone, therein adding a constant quantity of lime providing a slight stoichiometric excess thereof with respect to unreacted ammonium chloride, and removing free ammonia from the reacted product of said second zone, whereby substantially complete recovery of ammonia in free form is realized upon use of minimum quantity of lime.

References Cited in the file of this patent

UNITED STATES PATENTS

| | | |
|---|---|---|
| 1,450,023 | Edelman | Mar. 27, 1923 |
| 1,530,833 | Keeler | Mar. 24, 1925 |
| 1,781,987 | Means | Nov. 18, 1930 |
| 1,845,030 | Means | Feb. 16, 1932 |
| 1,878,979 | Tiddy | Sept. 20, 1932 |
| 1,962,150 | Mohler | June 12, 1934 |
| 2,029,467 | Day | Feb. 4, 1936 |
| 2,182,078 | Fleming et al. | Dec. 5, 1939 |